United States Patent
Bäurle (10) Patent No.: US 9,093,916 B2
(45) Date of Patent: Jul. 28, 2015

(54) DETECTING OUTPUT DIODE CONDUCTION TIME FOR CABLE DROP COMPENSATION OF A POWER CONVERTER

(75) Inventor: Stefan Bäurle, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 710 days.

(21) Appl. No.: 13/330,392

(22) Filed: Dec. 19, 2011

(65) Prior Publication Data

US 2013/0155724 A1 Jun. 20, 2013

(51) Int. Cl.
H02M 3/335 (2006.01)
H02M 1/42 (2007.01)
H02M 3/28 (2006.01)

(52) U.S. Cl.
CPC ........... *H02M 1/42* (2013.01); *H02M 3/28* (2013.01); *H02M 3/33507* (2013.01)

(58) Field of Classification Search
USPC .................. 323/282, 284, 285, 286, 287; 363/21.12, 21.14, 21.16, 21.17, 21.18; 307/103
See application file for complete search history.

(56) References Cited

U.S. PATENT DOCUMENTS

| 4,357,654 | A | * | 11/1982 | Ikenoue et al. | 363/21.06 |
| 6,304,470 | B1 | * | 10/2001 | Isago et al. | 363/65 |
| 8,242,765 | B2 | * | 8/2012 | Kunimatsu | 323/285 |
| 2008/0067994 | A1 | | 3/2008 | Kesterson et al. | |
| 2008/0246447 | A1 | * | 10/2008 | Djenguerian et al. | 323/234 |
| 2010/0238689 | A1 | * | 9/2010 | Fei et al. | 363/21.16 |

FOREIGN PATENT DOCUMENTS

| CN | 101291113 A | 10/2008 |
| CN | 101674013 A | 3/2010 |

OTHER PUBLICATIONS

CN 201210557217.3—First Office Action and Search Report with English Translation, issued Sep. 2, 2014 (17 pages).

* cited by examiner

*Primary Examiner* — Jue Zhang
*Assistant Examiner* — Lakaisha Jackson
(74) *Attorney, Agent, or Firm* — Blakely Sokoloff Taylor & Zafman LLP (57) ABSTRACT

An example controller for a power converter to provide power to a load through a distribution network includes a control circuit and a cable drop compensator. The control circuit outputs a drive signal to control switching of a switch to regulate an output of the power converter in response to a feedback signal. The cable drop compensator is coupled to adjust the feedback signal in response to a conduction time of an output diode of the power converter to compensate for a distribution voltage dropped across the distribution network.

12 Claims, 7 Drawing Sheets

DETECTING OUTPUT DIODE CONDUCTION TIME FOR CABLE DROP COMPENSATION OF A POWER CONVERTER

BACKGROUND INFORMATION

1. Field of the Disclosure

Embodiments of present invention relate generally to regulation of power converters, and more specifically, the invention relates to regulation of power converters with cable drop compensation.

2. Background

Many electrical devices such as cell phones, personal digital assistants (PDA's), laptops, etc. are powered by a source of relatively low-voltage DC power. Because power is generally delivered through a wall outlet as high-voltage AC power, a device, typically referred to as a power converter, is required to transform the high-voltage AC power to low-voltage DC power. The low-voltage DC power may be provided by the power converter directly to the device or it may be used to charge a rechargeable battery that, in turn, provides energy to the device, but which requires charging once stored energy is drained. Typically, the battery is charged with a battery charger that includes a power converter that meets constant current and constant voltage requirements required by the battery. Other electrical devices, such as DVD players, computer monitors, TVs and the like, also require a power converter for device operation. The power converter in these devices also has to provide output voltages and currents that meet the requirements of the device. In operation, a power converter may use a controller to regulate output power delivered to an electrical device, such as a battery, that may be generally referred to as a load. More specifically, the controller may be coupled to a sensor that provides feedback information of the output of the power converter in order to regulate power delivered to the load. The controller regulates power to the load by controlling a power switch to turn on and off in response to the feedback information from the sensor to transfer energy pulses to the output from a source of input power such as a power line. One particular type of power converter that may be used is a flyback power converter. In a flyback power converter, an energy transfer element may galvanically isolate the input side of the power converter from the output side. Galvanic isolation prevents DC current from flowing between the input side and the output side of the power converter, and is usually required to meet safety regulations.

Power converter control circuits may be used for a multitude of purposes and applications. There is a demand for integrating control circuit functionality that can reduce the number of components outside the integrated control circuit. This reduction in external component count enables miniaturization of the power converter to improve portability, reduces the number of design cycles required to finalize a power converter design and also improves reliability of the end product. Furthermore, reduced component count can offer energy efficiency improvements in the operation of the power converter and can reduce the power converter cost. Typically, a power converter has circuitry on the output side of the power converter to sense and to transmit feedback information about the output voltage to the control circuit that is on the input side of the power converter. One technique to reduce the number of components in the power converter is to sense the feedback information of the output voltage from the input side of the power converter instead of sensing it on the output side of the power converter. This is accomplished by a means of an indirect feedback. One challenge associated with power converters using indirect feedback is compensating for the varying voltage dropped across the impedance of a cable that connects the power converter (e.g. battery charger) to the load current. Indirect feedback can regulate the voltage at the output of the power converter that is at one end of the cable, but the voltage the other end of the cable will be different from the voltage at the output of the power converter by the voltage drop of the cable. By compensating for the additional voltage drop of the cable, the power converter provides improved voltage regulation at the load.

There are known discrete circuits that may compensate for the voltage drop of the cable. However, the known discrete circuits that compensate for the voltage drop across the cable may include additional components that increase the cost and size of the power converter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Examples related to detecting output diode conduction time for cable drop compensation of power converter are disclosed. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment," "an embodiment," "one example" or "an example" means that a particular feature, structure or characteristic described in connection with the embodiment is included in at least one embodiment or example of the present invention. Thus, the appearances of the phrases "in one embodiment," "in an embodiment," "in one example" or "in an example" in various places throughout this specification are not necessarily all referring to the same embodiment. The particular features, structures or characteristics may be combined for example into any suitable combinations and/or sub-combinations in one or more embodiments or examples. Furthermore, the particular features, structures or characteristics may be included in an integrated circuit, an electronic circuit, a combinational logic circuit, or other suitable components that provide the described functionality.

As will be discussed, example power converters and controllers in accordance with the teachings of the present invention includes a cable drop compensation feature that uses the conduction time of the output diode to determine the cable drop compensation. This cable drop compensation technique allows for a wider range of applicability and extends usability to power converters for all types of control methods. One control method referred to herein is termed "on/off" control. "On/off" herein refers to whether or not the power switch is enabled to conduct. An "on" cycle is one wherein the switch is enabled, and therefore, may conduct for a portion of time during that cycle, and an "off" cycle is one wherein the switch is disabled, or prevented from conducting. Thus, "on/off" in the present disclosure does not refer to whether the switch is, in fact, conducting in a given cycle, only whether or not switch conduction is enabled. Another control method referred to as pulse width modulation herein is termed "PWM." More specifically, PWM involves modulating the on time, also referred to as the conduction time of the switch, during a cycle that may be of fixed duration or variable duration. Another form of PWM involves modulating the off time of the switch, which is when the switch is prevented from conducting, during a cycle that may be of fixed duration or variable duration. It is appreciated that modulating the on time is indistinguishable from modulating the off time when the switching cycles are of fixed duration. Examples of the disclosed power converters and methods may be used in a variety of applications in which the input side of the power converter is galvanically isolated from the output side and a load voltage is regulated in response to sensing a signal at the input side representative of the output voltage of the power converter.

Figure 1:
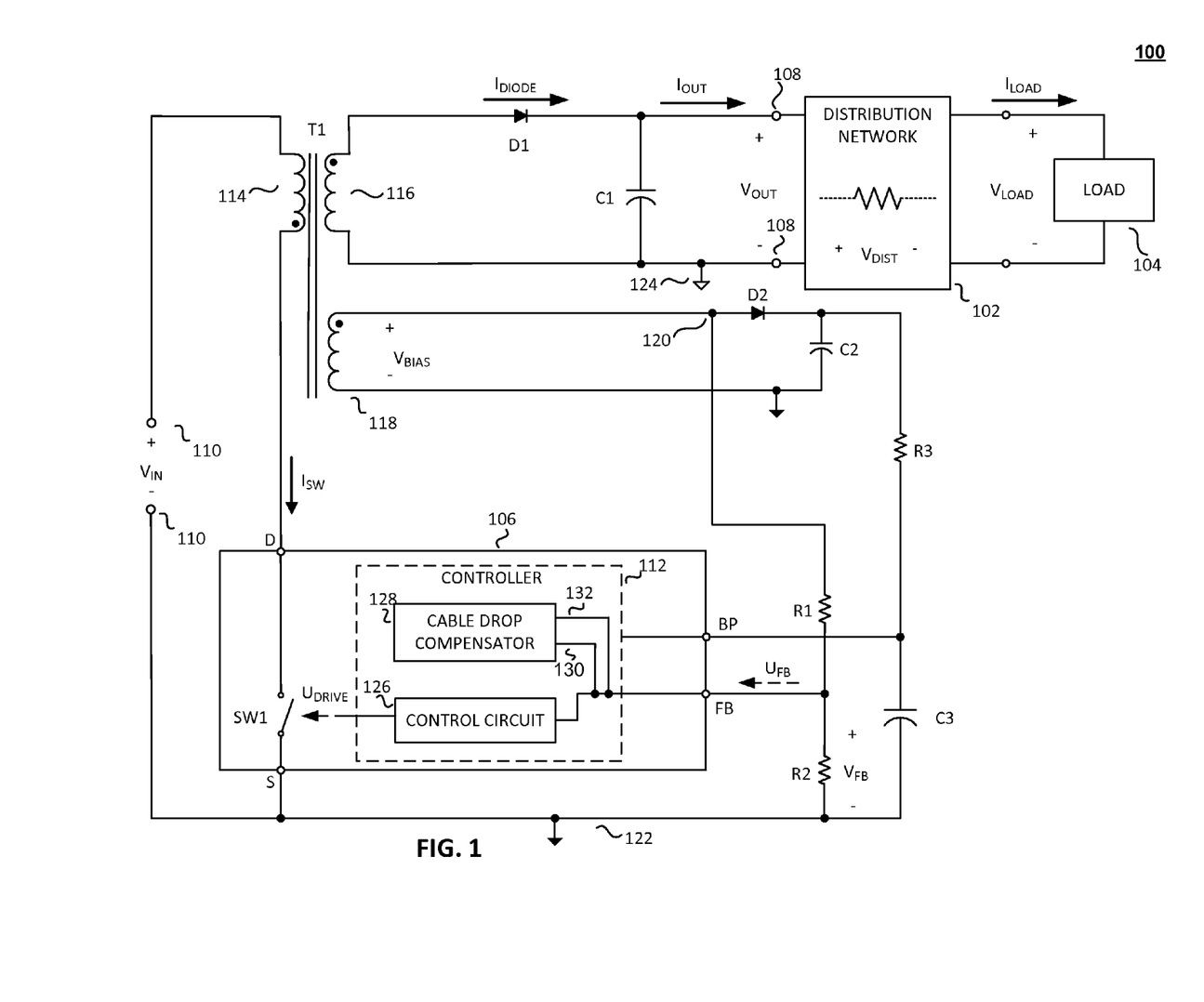
FIG. 1 is functional block diagram illustrating an example power converter coupled to a distribution network and load including an example controller, in accordance with the teachings of the present invention.

To illustrate, FIG. 1 shows generally an example power converter 100 coupled to a distribution network 102 and a load 104, including an example controller 112, in accordance with the teachings of the present invention. As shown, the distribution network 102 is coupled to output terminals 108 that provide an output voltage $V_{OUT}$. A load current $I_{LOAD}$ is also provided through output terminals 108 and through the distribution network 102 to supply the load 104. Typically, the distribution network 102 includes a cable, such as for example a power cord. In one example, the distribution network 102 may include, but is not limited to, terminal interfaces and/or any other elements that provide additional resistance at the output side of the power converter 100. The terminal interfaces may include for example a connection interface between the power supply and the cable as well as a connection interface between the cable and the load.

As shown, input terminals 110 are to be coupled to a supply that provides an input voltage $V_{IN}$. Input terminals 110 are coupled to an energy transfer element T1, which in the illustrated example provides galvanic isolation between input terminals 110 and output terminals 108. In other words, the energy transfer element T1 prevents DC current from flowing from the input side to the output side of the power converter 100. In one example, energy transfer element T1 includes an input winding 114 and an output winding 116. An "input winding" may also be referred to as a "primary winding" and an "output winding" may also be referred to as a "secondary winding." Although not shown, power converter 100 may include a clamp circuit that is coupled across input winding 114 of energy transfer element T1 to limit the voltage across switch SW1.

As shown, controller 112 is coupled to generate a drive signal $U_{DRIVE}$ to control the switching of switch SW1 to regulate the output at output terminals 108. Although FIG. 1 illustrates switch SW1 and controller 112 as being included in a single integrated circuit 106, it is appreciated that in other embodiments, switch SW1 and controller 112 may be fabricated separately and/or included in separate integrated circuits.

In various examples, controller 112 may include features to employ any of a variety of switching schemes including but not limited to, on/off control, on/off control with varying current limit levels, variable or constant frequency pulse width modulation (PWM), or the like. Integrated circuit 106 includes a feedback terminal FB that is coupled to receive a feedback signal $U_{FB}$ that is representative of an output value at output terminals 108. In one example, feedback signal $U_{FB}$ is representative of output voltage $V_{OUT}$. In the illustrated example, bypass terminal BP is coupled to a bypass capacitor C3, which provides supply current to the internal circuitry of controller 112 during operation.

In the example, FIG. 1 illustrates energy transfer element T1 as further including an auxiliary winding 118 that generates a bias winding voltage $V_{BIAS}$ at node 120. A resistor divider (i.e., resistors R1 and R2) provides feedback signal $U_{FB}$ which is coupled to be received at the feedback terminal FB of integrated circuit 106. In one example, bias winding voltage $V_{BIAS}$ appearing across auxiliary winding 118 and is substantially proportional to the output voltage $V_{OUT}$ of power converter 100 during a time after switch SW1 is turned off. In one example, values for resistors R1 and R2 may be chosen based on the desired level of load voltage $V_{LOAD}$ at a given load current, accounting for the voltage drop of rectifier D1 when it is conducting. In other examples, using a PWM control method, it is appreciated that the supply current for controller 112 to operate may be derived from the auxiliary winding 118 by way of diode D2, resistor R3 and capacitor C3.

In operation, controller 112 regulates the output of power converter 100 by switching power switch SW1 in response to feedback signal $U_{FB}$. When power switch SW1 is on, energy from the input of power converter 100 is transferred into input winding 114 of energy transfer element T1 and is stored in the energy transfer element T1. When power switch SW11 is turned off, the energy stored in energy transfer element T1 is transferred to output winding 116. The energy from output winding 116 is transferred to the output terminals 108 of power converter 100 with a pulsating current that flows through a forward biased rectifier D1 to an output capacitor C1. In one example, rectifier D1 is a diode. A substantially DC (non-pulsating) load current $I_{LOAD}$ flows from output terminals 108 through a distribution network 102 to load 104. An input return 122 is coupled to input terminals 110 and an output return 124 is coupled to output terminals 108. In one example, the input return 122 and output return 124 may be coupled together.

As shown, load current $I_{LOAD}$ is delivered through the distribution network 102 to supply the load 104. In one example, the load 104 may represent a device that is to be charged, such as a cell phone battery and may require a regulated load voltage $V_{LOAD}$. In operation, controller 112 produces pulsating current in the output winding 116. The current in output winding 116 is rectified by the rectifier D1 and is filtered by output capacitor C1 to produce the substantially constant output voltage $V_{OUT}$. As load current $I_{LOAD}$ increases, a distribution voltage drop $V_{DIST}$ increases in proportion, due to a substantially constant resistance in the distribution network 102. In one example, power converter 100 may compensate for the distribution voltage drop $V_{DIST}$ for better regulation at load 104 by controlling the output voltage $V_{OUT}$ in accordance with the teachings of the present invention. In one example, the power converter 100 may operate in a discontinuous conduction mode (DCM), where all energy from the energy transfer element T1 is transferred to the output winding 116 before the input winding 114 receives more energy from the input 110.

In accordance with the teachings of the present invention, the variation of load voltage $V_{LOAD}$ due to distribution network 102 is reduced as compared to prior power converters. This is accomplished by adjusting the output voltage $V_{OUT}$ to compensate for a changing voltage drop $V_{DIST}$ across the distribution network 102. As described above, the distribution voltage drop $V_{DIST}$ will change in response to the current delivered to the load 104. Typically, a change in load current $I_{LOAD}$ corresponds with a change in the on-time and/or switching frequency of switch SW1. As a result of the change in on-times and/or switching frequency, the average conduction time of rectifier D1 may also change during the off-time of switch SW1. Therefore, examples disclosed herein teach detecting the conduction time of rectifier D1 and adjusting the feedback signal $U_{FB}$ in response thereto such that the regulated output voltage $V_{OUT}$ changes to compensate for the changes in distribution voltage $V_{DIST}$.

For example, as illustrated in FIG. 1, controller 112 includes a control circuit 126 and a cable drop compensator 128. Control circuit 126 is coupled to generate drive signal $U_{DRIVE}$ to control switching of switch SW1 to regulate the output of power converter 100 in response to feedback signal $U_{FB}$. In one example, control circuit 126 includes an oscillator and logic circuits (not shown). Cable drop compensator 128 includes a feedback signal input 130 and a feedback compensation output 132. As shown in FIG. 1, feedback signal input 130 is coupled to receive the feedback signal $U_{FB}$. As will be discussed in more detail below, cable drop compensator 128 may detect a conduction time of diode D1 by monitoring the feedback signal $U_{FB}$ at feedback signal input 130. Cable drop compensator 128 is then configured to adjust the feedback signal $U_{FB}$ in response to the determined conduction time. For example, feedback compensation output 132 may sink current from feedback terminal FB, such that control circuit 126 adjusts the output voltage $V_{OUT}$ due to the drop in the feedback signal $U_{FB}$.

When the load current $I_{LOAD}$ is high, a relatively high distribution voltage drop $V_{DIST}$ will be present, and when the load current $I_{LOAD}$ is low, a relatively low distribution voltage drop $V_{DIST}$ will be present. As mentioned above, a high load current $I_{LOAD}$ corresponds with higher average conduction times of rectifier D1. Therefore, improved regulation of load voltage $V_{LOAD}$ may be accomplished when feedback compensation output 132 adjusts feedback signal $U_{FB}$ proportionately to the conduction time of rectifier D1 to compensate for the distribution voltage drop $V_{DIST}$.

Figure 2:
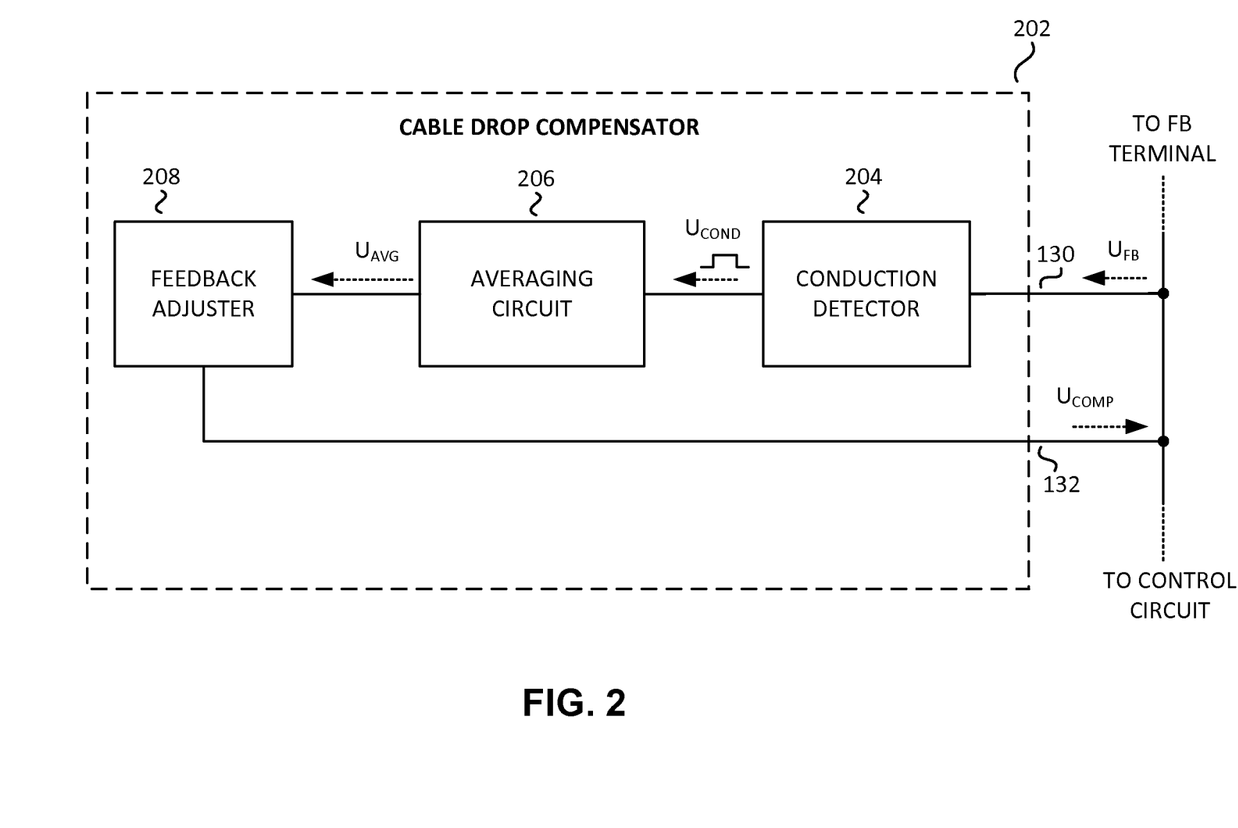
FIG. 2 is a functional block diagram illustrating an example cable drop compensator, in accordance with the teachings of the present invention.

FIG. 2 is a functional block diagram illustrating an example cable drop compensator 202, in accordance with the teachings of the present invention. Cable drop compensator 202 is one possible implementation of cable drop compensator 128 of FIG. 1. The illustrated example of cable drop compensator 202 includes feedback signal input 130, feedback compensation output 132, conduction detector 204, averaging circuit 206, and feedback adjuster 208.

As shown in FIG. 2, conduction detector 204 is coupled to feedback signal input 130 to receive the feedback signal $U_{FB}$. Conduction detector 204 outputs a conduction signal $U_{COND}$ in response to the feedback signal $U_{FB}$, where the conduction signal $U_{COND}$ indicates whether rectifier D1 is conducting. For example, conduction signal $U_{COND}$ may be a logic signal that is HIGH when rectifier D1 is conducting and a LOW when rectifier D1 is not conducting. Thus, in one example, a pulse width of conduction signal $U_{COND}$ may be representative of the conduction time of rectifier D1 during at least one switching cycle.

Averaging circuit 206 is coupled to conduction detector 204 to receive conduction signal $U_{COND}$. Averaging circuit 206 outputs an averaging signal $U_{AVG}$ in response to the conduction signal $U_{COND}$, where the averaging signal $U_{AVG}$ is representative of an average conduction time of rectifier D1. For example, averaging signal $U_{AVG}$ may be representative of the average conduction time of rectifier D1 over several switching cycles.

Feedback adjuster 208 is coupled to averaging circuit 206 to receive the averaging signal $U_{AVG}$. Feedback adjuster 208 outputs compensation signal $U_{COMP}$ to feedback compensation output 132 in response to the averaging signal $U_{AVG}$. Thus, feedback adjuster 208 generates compensation signal $U_{COMP}$ to adjust the feedback signal $U_{FB}$ in response to the average conduction time of rectifier D1, as indicated by averaging signal $U_{AVG}$. In one example, feedback adjuster 208 adjusts the feedback signal $U_{FB}$ by sinking current from feedback terminal FB to input return 122 to adjust the feedback signal $U_{FB}$. Due to the adjustment of the feedback signal $U_{FB}$, control circuit 126 (see FIG. 1) adjusts the output voltage $V_{OUT}$ thus, compensating for changes in distribution voltage $V_{DIST}$.

Figure 3:
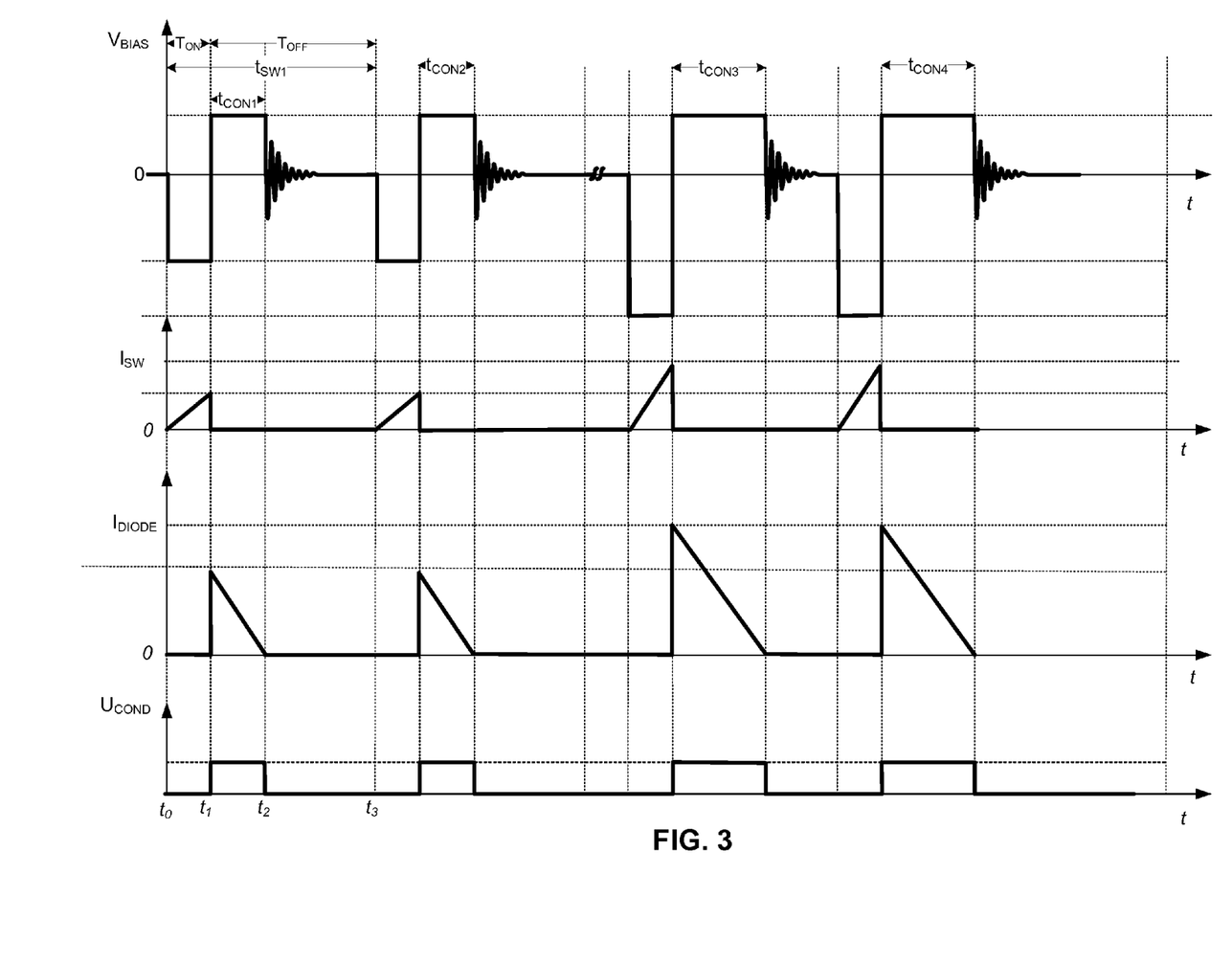
FIG. 3 illustrates example waveforms of signals corresponding with the example power converter of FIG. 1 and cable drop compensator of FIG. 2, in accordance with the teachings of the present invention.

FIG. 3 illustrates example waveforms of signals corresponding with the example power converter of FIG. 1 and cable drop compensator of FIG. 2, in accordance with the teachings of the present invention. As shown in the depicted example, a pulse of switch current $I_{SW}$ begins at time to at the beginning of switching period $T_{SW1}$ when switch SW1 is turned on. At time $t_1$, switch SW1 is turned off and the pulse of switch current $I_{SW}$ ends. In one example, during the on time (i.e., to until ti) bias voltage $V_{BIAS}$ goes negative to a magnitude that is representative of input voltage $V_{IN}$. At time $t_1$, bias voltage $V_{BIAS}$ rises until the output rectifier D1 begins to conduct diode current $I_{DIODE}$. While diode D1 is conducting, the bias winding voltage $V_{BIAS}$ is a positive voltage that is representative of output voltage $V_{OUT}$. At time $t_2$, diode D1 stops conducting diode current $I_{DIODE}$ and a decaying oscillation of bias voltage $V_{BIAS}$ begins. In switching period $T_{SW1}$, the conduction time $t_{con1}$ of rectifier D1 is time $t_2$ minus ti. As shown in FIG. 3, conduction signal $U_{COND}$ is a logic signal that goes HIGH while bias voltage $V_{BIAS}$ indicates that diode D1 is conducting (e.g., from time $t_1$ to time $t_2$). In one example, conduction detector 204 detects that output diode D1 is conducting when the feedback signal $U_{FB}$ is above a voltage threshold $V_{TH}$. In other words, the bias winding voltage $V_{BIAS}$ being above a certain voltage level may be used as an indicator that output diode D1 is conducting. Switch SW1 is subsequently turned off at time t3 thereby ending switching period $T_{SW1}$ and beginning the next switching period.

As discussed above, averaging circuit 206 may output averaging signal $U_{AVG}$ that is representative of the average conduction time of diode D1 over several switching cycles. For example, averaging signal $U_{AVG}$ may represent the average of $t_{CON1}$, $t_{CON2}$, $t_{CON3}$, and $t_{CON4}$.

Figure 4:
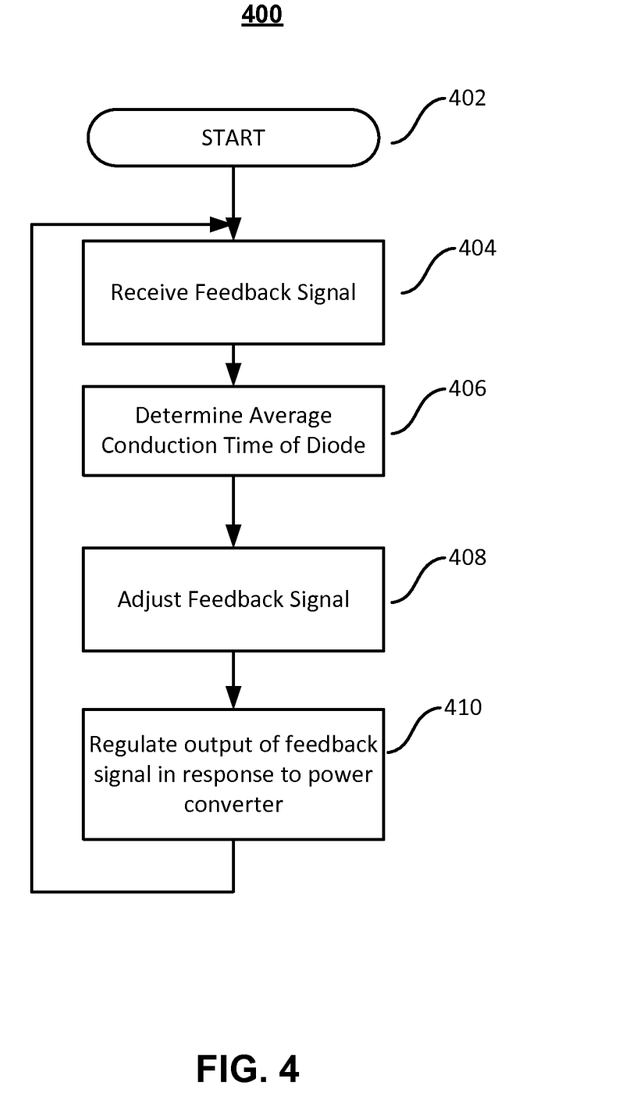
FIG. 4 is a flow chart illustrating an example process for cable drop compensation for a power converter, in accordance with the teachings of the present invention.

FIG. 4 is a flow chart illustrating an example process 400 for cable drop compensation for a power converter, in accordance with the teachings of the present invention. As shown in the illustrated example, process 400 begins at block 402, and in block 404, feedback signal $U_{FB}$ is received by, for example, conduction detector 204. In block 406, the average conduction time of output diode D1 is detected by a circuit, such as averaging circuit 206. In block 408, feedback adjuster 208 adjusts the feedback signal in response to the average conduction time as indicated by averaging signal $U_{AVG}$. In block 410, output voltage $V_{OUT}$ is regulated in response to the adjusted feedback signal $U_{FB}$ to compensate for distribution voltage $V_{DIST}$ and limit the variance of load voltage $V_{LOAD}$. Process 400 then returns to block 404.

Figure 5:
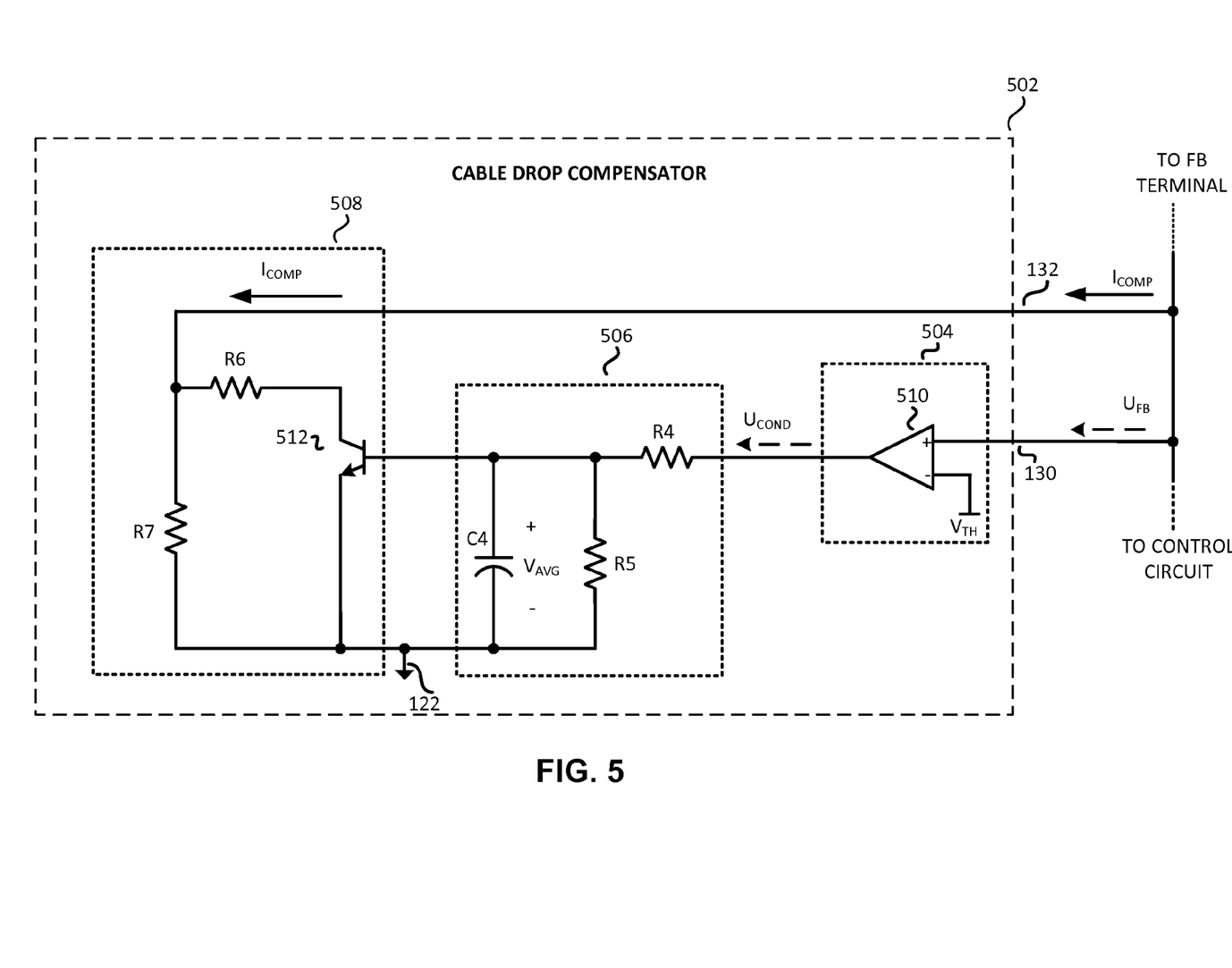
FIG. 5 is a schematic illustrating an example cable drop compensator, in accordance with the teachings of the present invention.

FIG. 5 is a schematic illustrating an example cable drop compensator 502, in accordance with the teachings of the present invention. Cable drop compensator 502 is one possible implementation of cable drop compensators 128 and/or 202 of FIGS. 1 and 2. The illustrated example of cable drop compensator 502 includes conduction detector 504, averaging circuit 506, and feedback adjuster 508. Conduction detector 504 is illustrated as including a comparator 510 and a source of a threshold voltage $V_{TH}$. Averaging circuit 506 is illustrated as including an RC circuit of resistors R4 and R5 and capacitor C4. Feedback adjuster 508 is illustrated as including a transistor 512 and resistors R6 and R7.

Comparator 510 includes a non-inverting input coupled to receive feedback signal $U_{FB}$ via feedback signal input 130. In one embodiment, feedback signal $U_{FB}$ is a voltage, such as the feedback voltage $V_{FB}$ across resistor R2 of FIG. 1. As mentioned above, the feedback voltage $V_{FB}$ is representative of the output voltage $V_{OUT}$, at least, during a portion of the off time of switch SW1 and may also indicate the time at which output rectifier D1 is conducting. Thus, comparator 510 compares the feedback voltage $V_{FB}$ received on its non-inverting input with threshold voltage $V_{TH}$ received on its inverting input. Comparator 501 outputs a conduction signal $U_{COND}$ in a logic HIGH state when the feedback voltage $V_{FB}$ exceeds the threshold voltage $V_{TH}$, such as is shown between times $t_1$ and $t_2$ of FIG. 3. A drop in the feedback voltage $V_{FB}$ to below the threshold voltage $V_{TH}$ indicates that output diode D1 has ceased conducting and thus the output of comparator 510 (i.e., conduction signal $U_{COND}$) transitions to a logic LOW, such as is shown at time $t_2$ in FIG. 3.

Averaging circuit 506 is coupled to receive the conduction signal $U_{COND}$ and to average the conduction times of diode D1 over several switching cycles of switch SW1. As mentioned above, the pulse width of conduction signal $U_{COND}$ is representative of the conduction time of diode D1 during a switching cycle. Thus, resistors R4 and R5 are coupled to charge capacitor C4 with conduction signal $U_{COND}$ such that the accumulated voltage (i.e., averaging voltage $V_{AVG}$) across capacitor C4 is representative of the average conduction time of output diode D1 over one or more switching cycles.

Figure 6:
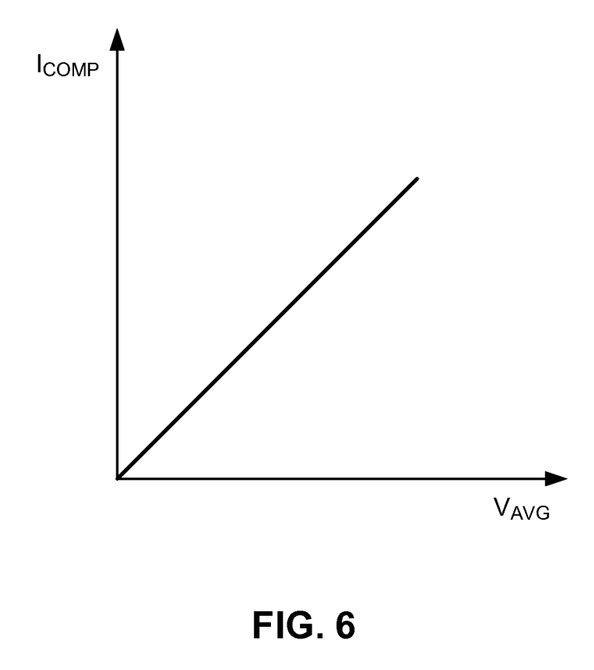
FIG. 6 illustrates an example relationship between the signals $I_{COMP}$ (compensation current) and $V_{AVG}$ (averaging voltage) of FIG. 5, in accordance with the teachings of the present invention.

The control terminal (e.g., base) of transistor 512 is coupled to receive the averaging voltage $V_{AVG}$ and to control the amount of current drawn by transistor 512 away from the feedback terminal FB to input return 122. In one example, the higher the averaging voltage $V_{AVG}$, the higher the compensation current $I_{COMP}$. By way of further example, transistor 512 may be configured to operate in a linear region of operation such that the compensation current $I_{COMP}$ is proportional to the averaging voltage $V_{AVG}$. FIG. 6 illustrates an example relationship between the compensation current $I_{COMP}$ and averaging voltage $V_{AVG}$, in accordance with the teachings of the present invention. Thus, since the averaging voltage $V_{AVG}$ is representative of the average conduction time of the output diode D1, the feedback signal $U_{FB}$ is reduced by an amount (i.e., $I_{COMP}$) that is proportional to the average conduction time.

Referring back to FIG. 1, control circuit 126 is configured to regulate an output (e.g., output voltage $V_{OUT}$) in response to the feedback signal $U_{FB}$. The adjustment of the feedback signal $U_{FB}$ by cable drop compensator 128 allows control circuit 126 to compensate for distribution voltage $V_{DIST}$ and to limit variances of load voltage $V_{LOAD}$. For example, an increase in load current $I_{LOAD}$ will typically correspond to an increase in distribution voltage $V_{DIST}$. However, as discussed above, the increase in load current $I_{LOAD}$ may be detected by way of an increased average conduction time of diode D1 by cable drop compensator 128. Cable drop compensator 128 may then reduce the feedback signal $U_{FB}$ by sinking current from feedback terminal FB. The reduction in the feedback signal $U_{FB}$ then causes the control circuit 126 to increase the regulated output voltage $V_{OUT}$, thereby compensating for the increase in distribution voltage $V_{DIST}$ dropped across distribution network 102.

Figure 7:
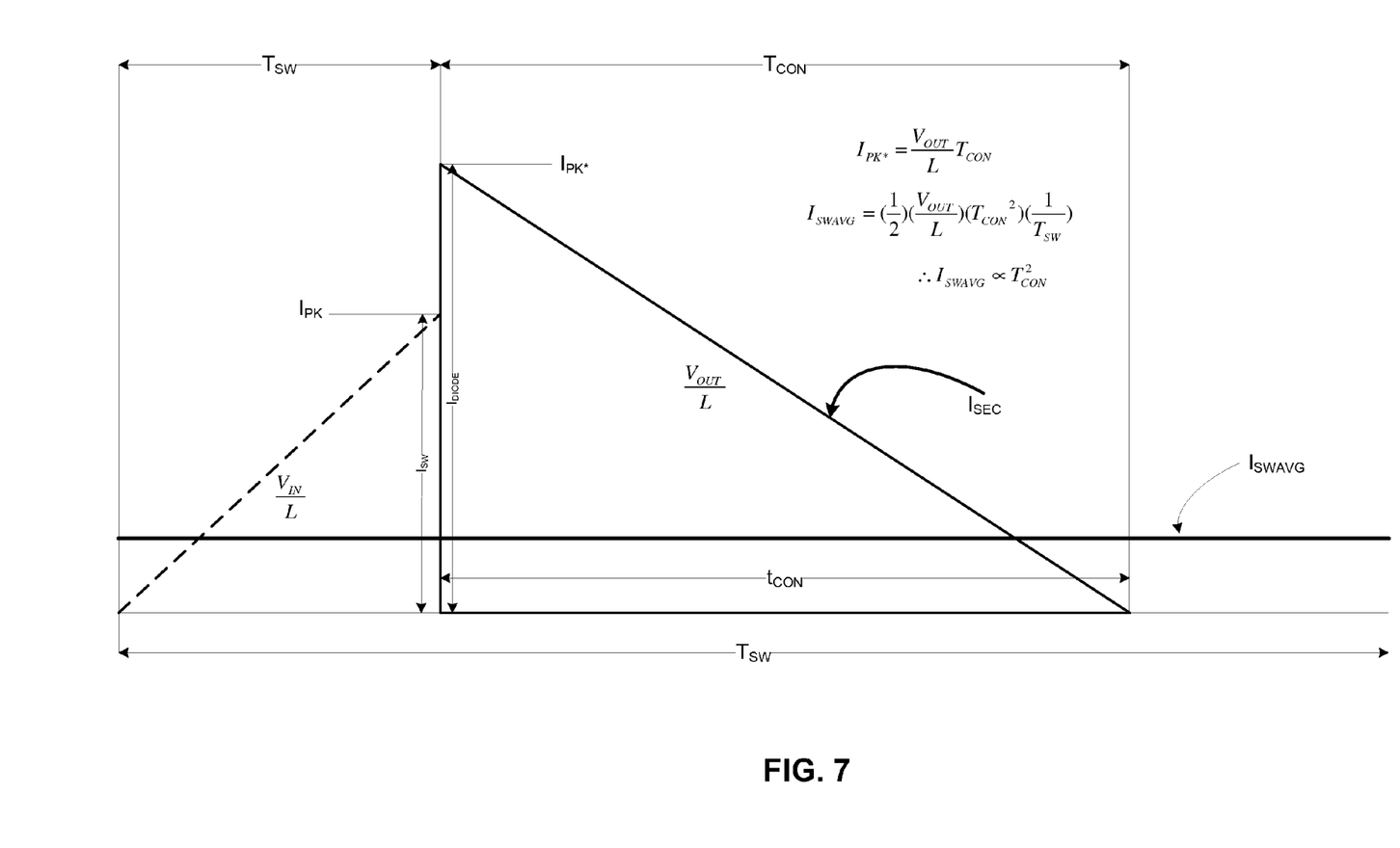
FIG. 7 illustrates an example relationship between the average switch current and output diode conduction time, in accordance with the teachings of the present invention.

FIG. 7 illustrates an example relationship between the, secondary side switch current $I_{SEC}$, average switch current $I_{SWAVG}$, and output diode conduction time $T_{CON}$ in a switching cycle $T_{SW}$ of a power converter operating in discontinuous conduction mode (DCM) in accordance with the teachings of the present invention. As shown, the peak $I_{PK}*$ of secondary switch current $I_{SEC}$ is determined by the output voltage $V_{OUT}$, inductance of energy transfer element L, and conduction time $T_{CON}$ of output diode D1. As shown below, the relationship is illustrated in the following equation:

$$I_{PK}* = \frac{V_{OUT}}{L} \times T_{CON} \tag{1}$$

The average output current $I_{OUTAVG}$, defined as the average current delivered to the output over the entire switching cycle $T_{SW}$, is illustrated by the following equation in terms of peak $I_{PK}*$ of secondary switch current $I_{SEC}$ and conduction time $T_{CON}$ of output diode D1:

$$I_{OUTAVG} = \frac{\frac{1}{2} \times (I_{PK*}) \times T_{CON}}{T_{SW}} \tag{2}$$

When combining equation 2 with equation 1 the following equation results:

$$I_{OUTAVG} = \frac{V_{OUT} \times T_{CON}^2}{2 \times L \times T_{SW}} \tag{3}$$

Since the inductance value L, the switching period $T_{SW}$ is set to be constant, and output voltage $V_{OUT}$ is set to be regulated at a constant value therefore the average output current $I_{OUTAVG}$ is proportional to the square of the conduction time $T_{CON}$:

$$I_{OUTAVG} \propto T_{CON}^2 \tag{4}$$

If the average output switch current $I_{OUTAVG}$ over a switching cycle $T_{SW}$ is proportional to the square of diode conduction time $T_{CON}$ over one switching cycle $T_{SW}$, than a similar relationship may be drawn over multiple switching cycles to, and the conduction time $T_{CON}$ may be used to determine the load current $I_{LOAD}$ (average output current $I_{OUTAVG}$ over multiple switching cycles). In this manner, according to the teachings of the present invention, a power controller may determine the load current $I_{LOAD}$ in response to determining diode conduction time $T_{CON}$ of the power converter. As such, the controller may then appropriately compensate for the voltage drop $V_{DIST}$ across the distribution network coupled to the output power converter to provide the desired voltage with minimal variance at the load, under varying load conditions.

In the foregoing detailed description, the method and apparatus of the present invention have been described with reference to specific examples or embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A controller for a power converter to provide power to a load through a distribution network, the controller comprising:
   a control circuit that outputs a drive signal to control switching of a switch to regulate an output of the power converter in response to a feedback signal; and
   a cable drop compensator configured to sink current from a feedback terminal of the controller to adjust the feedback signal in response to a conduction time of an output diode of the power converter to compensate for a distribution voltage dropped across the distribution network, wherein the cable drop compensator comprises:
      a comparator coupled to compare the feedback signal with a threshold value and to output a first signal indicating whether the output diode is conducting;
      a feedback adjuster coupled to adjust the feedback signal in response to the first signal indicating that the output diode is conducting; and
      an averaging circuit that outputs a second signal in response to the first signal, wherein the second signal indicates an average conduction time of the output diode, and wherein the feedback adjuster is coupled to receive the second signal and to adjust the feedback signal in response thereto.

2. The controller of claim 1, wherein the averaging circuit includes a resistor-capacitor (RC) circuit coupled to receive the first signal and to generate the second signal in response thereto.

3. The controller of claim 1, wherein the feedback adjuster is coupled to reduce the feedback signal by an amount that is proportional to the average conduction time as indicated by the second signal.

4. The controller of claim 1, wherein the feedback adjuster is coupled to the feedback terminal to sink current from the feedback terminal in response to the average conduction time of the output diode.

5. The controller of claim 4, wherein the feedback adjuster comprises a transistor having first and second terminals coupled to sink current from feedback terminal to an input return, the transistor further having a control terminal coupled to receive the second signal.

6. The controller of claim 1, wherein the controller and the switch are included in an integrated circuit.

7. A power converter for providing power to a load through a distribution network, the power converter comprising:
   an energy transfer element coupled between an input and an output of the power converter;
   a switch coupled to the energy transfer element to control a transfer of energy from the input to the output;
   a controller coupled to control switching of the switch to regulate the output, the controller including:
      a control circuit that outputs a drive signal to control the switch in response to a feedback signal; and
      a cable drop compensator configured to sink current from a feedback terminal of the controller to adjust the feedback signal in response to a conduction time of an output diode of the power converter to compensate for a distribution voltage dropped across the distribution network, wherein the cable drop compensator comprises:
         a comparator coupled to compare the feedback signal with a threshold value and to output a first signal indicating whether the output diode is conducting;
         a feedback adjuster coupled to adjust the feedback signal in response to the first signal indicating that the output diode is conducting; and
         an averaging circuit that outputs a second signal in response to the first signal, wherein the second signal indicates an average conduction time of the output diode, and wherein the feedback adjuster is coupled to receive the second signal and to adjust the feedback signal in response thereto.

8. The power converter of claim 7, wherein the averaging circuit includes a resistor-capacitor (RC) circuit coupled to receive the first signal and to generate the second signal in response thereto.

9. The power converter of claim 7, wherein the feedback adjuster is coupled to reduce the feedback signal by an amount that is proportional to the average conduction time as indicated by the second signal.

10. The power converter of claim 7, wherein the feedback adjuster is coupled to the feedback terminal to sink current from the feedback terminal in response to the average conduction time of the output diode.

11. The power converter of claim 10, wherein the feedback adjuster comprises a transistor having first and second terminals coupled to sink current from feedback terminal to an input return, the transistor further having a control terminal coupled to receive the second signal.

12. A method for a power converter to provide power to a load through a distribution network, the method comprising:
   receiving a feedback signal at a controller, the feedback signal representative of an output of the power converter;
   detecting a conduction time of an output diode of the power converter in response to the feedback signal;
   detecting an average conduction time of the output diode in response to the feedback signal;
   adjusting the feedback signal in response to the conduction time of the output diode to compensate for a distribution voltage dropped across the distribution network, wherein adjusting the feedback signal includes reducing the feedback signal by an amount that is proportional to the average conduction time; and
   outputting a drive signal to control switching of a switch to regulate the output of the power converter in response to the feedback signal.

* * * * *